(12) United States Patent
Tanaka et al.

(10) Patent No.: US 10,793,465 B2
(45) Date of Patent: Oct. 6, 2020

(54) BASE MATERIAL FOR DISK ROLL, PRODUCTION METHOD THEREOF, DISK ROLL AND PRODUCTION METHOD THEREOF

(71) Applicant: NICHIAS CORPORATION, Tokyo (JP)

(72) Inventors: Ryo Tanaka, Chuo-ku (JP); Shigeru Nakama, Chuo-ku (JP); Kazuhisa Watanabe, Chuo-ku (JP)

(73) Assignee: NICHIAS CORPORATION, Tokyo (JP)

( * ) Notice: Subject to any disclaimer, the term of this patent is extended or adjusted under 35 U.S.C. 154(b) by 0 days.

(21) Appl. No.: 16/327,156

(22) PCT Filed: Jul. 12, 2017

(86) PCT No.: PCT/JP2017/025332
§ 371 (c)(1),
(2) Date: Feb. 21, 2019

(87) PCT Pub. No.: WO2018/037745
PCT Pub. Date: Mar. 1, 2018

(65) Prior Publication Data
US 2019/0225531 A1    Jul. 25, 2019

(30) Foreign Application Priority Data

Aug. 25, 2016   (JP) ................. 2016-164664

(51) Int. Cl.
*C03B 35/18*   (2006.01)
*C03B 17/06*   (2006.01)
(Continued)

(52) U.S. Cl.
CPC .......... *C03B 35/181* (2013.01); *C03B 17/068* (2013.01); *C03B 35/186* (2013.01);
(Continued)

(58) Field of Classification Search
CPC ....... C04B 35/66; C04B 35/803; C04B 33/28; C04B 33/02; C03B 35/189
See application file for complete search history.

(56) References Cited

U.S. PATENT DOCUMENTS

| 4,416,043 A | 11/1983 | Aoki et al. |
| 2003/0181302 A1 | 9/2003 | Kaiser et al. |

(Continued)

FOREIGN PATENT DOCUMENTS

| CN | 1663929 A | 9/2005 |
| CN | 102844272 A | 12/2012 |

(Continued)

OTHER PUBLICATIONS

Barton, CD and AD Karanthanasis. "Clay Minerals". Encyclopedia of Soil Science, 2002, pp. 187-192. (Year: 2002).*

(Continued)

*Primary Examiner* — Karl E Group
(74) *Attorney, Agent, or Firm* — Oliff PLC

(57) ABSTRACT

A base material for a disk roll containing a layered silicate, in which the layered silicate is constituted to contain two or more kinds of minerals having an interlayer distance exceeding 10 angstroms. A base material for a disk roll is excellent in the compressive strength and wear resistance thereby.

11 Claims, 2 Drawing Sheets

(51) Int. Cl.
  *C04B 35/185* (2006.01)
  *C04B 35/195* (2006.01)
  *C04B 35/626* (2006.01)
  *C04B 35/16* (2006.01)
  *F27B 9/24* (2006.01)
  *C04B 33/13* (2006.01)
  *C21D 1/00* (2006.01)
  *F16C 13/00* (2006.01)
  *C04B 33/28* (2006.01)

(52) U.S. Cl.
  CPC .......... *C03B 35/189* (2013.01); *C04B 33/131* (2013.01); *C04B 33/1305* (2013.01); *C04B 33/28* (2013.01); *C04B 35/16* (2013.01); *C04B 35/185* (2013.01); *C04B 35/195* (2013.01); *C04B 35/62625* (2013.01); *C21D 1/00* (2013.01); *F16C 13/00* (2013.01); *F27B 9/24* (2013.01); *C04B 2235/349* (2013.01); *C04B 2235/3481* (2013.01); *C04B 2235/5228* (2013.01); *C04B 2235/96* (2013.01); *C04B 2235/963* (2013.01); *C04B 2235/9669* (2013.01)

(56) References Cited

U.S. PATENT DOCUMENTS

| | | |
|---|---|---|
| 2004/0220032 A1 | 11/2004 | Nakayama et al. |
| 2007/0231526 A1 | 10/2007 | Nakayama et al. |
| 2008/0120995 A1 | 5/2008 | Neubauer et al. |
| 2010/0113238 A1 | 5/2010 | Horiuchi et al. |
| 2011/0287916 A1 | 11/2011 | Watanabe et al. |
| 2013/0095318 A1 | 4/2013 | Lagaron Cabello et al. |

FOREIGN PATENT DOCUMENTS

| | | |
|---|---|---|
| JP | S56169169 A | 12/1981 |
| JP | H10324534 A | 12/1998 |
| JP | 2004299980 A | 10/2004 |
| JP | 2005249263 A | 9/2005 |
| JP | 2007269604 A | 10/2007 |
| JP | 2009132619 A | 6/2009 |
| JP | 2010510956 A | 4/2010 |
| JP | 2013018681 A | 1/2013 |
| TW | 201200440 A | 1/2012 |
| WO | 2012070650 A1 | 5/2012 |

OTHER PUBLICATIONS

Sep. 29, 2019 Search Report issued in Chinese Patent Application No. 2017800495504.
Mar. 1, 2018 International Search Report in Patent Application No. PCT/JP2017/025332.
Jul. 9, 2018 Office Action Issued in Taiwanese Patent Application No. 106123744.
Oct. 22, 2018 Office Action Issued in Taiwanese Patent Application No. 106123744.
Jan. 29, 2019 Notification of Reasons for Refusal for Japanese Patent Application No. 2016-164664.
Uehara, Seiichiro, "Basic Lecture on Clay 1, Structure and Chemical Composition of Clay" Nendo Kagaku, vol. 40 (2) (2000), pp. 100-111.
Mar. 7, 2019 International Preliminary Report on Patentability in Patent Application No. PCT/JP2017/025332.
Jan. 23, 2020 Examination Report issued in Indian Patent Application No. 201947007006.

* cited by examiner

[FIG. 1]
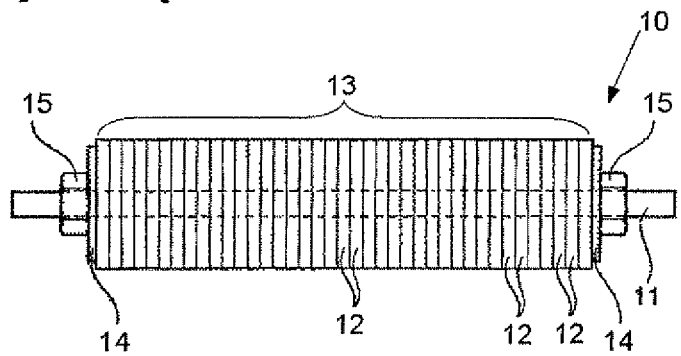
[FIG. 2]
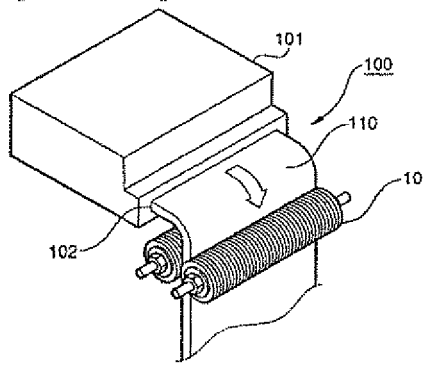
[FIG. 3]
(a)
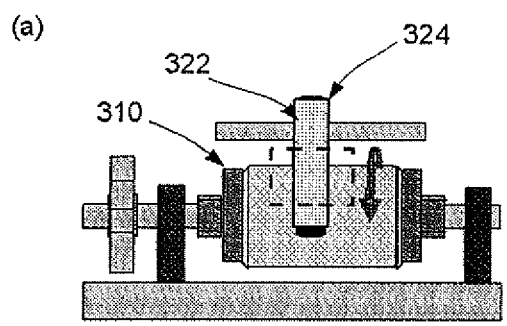
(b)
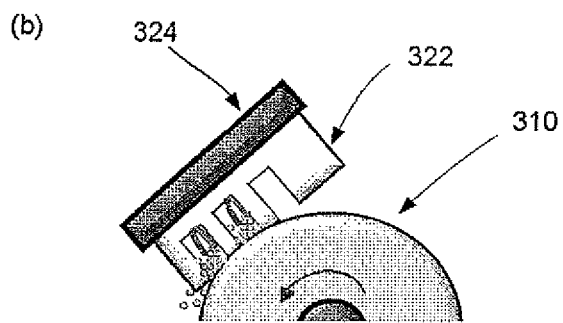

[FIG. 4]
(a)
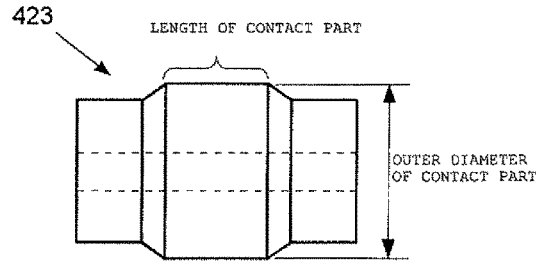
(b)
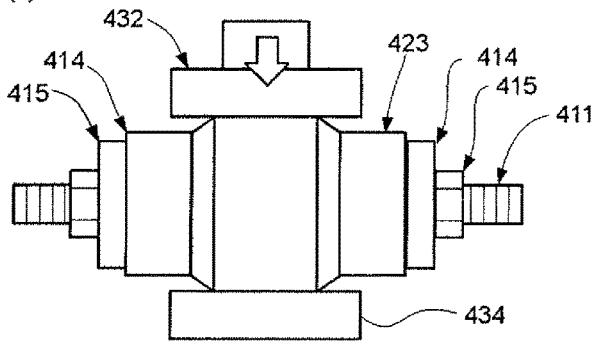
[FIG. 5]
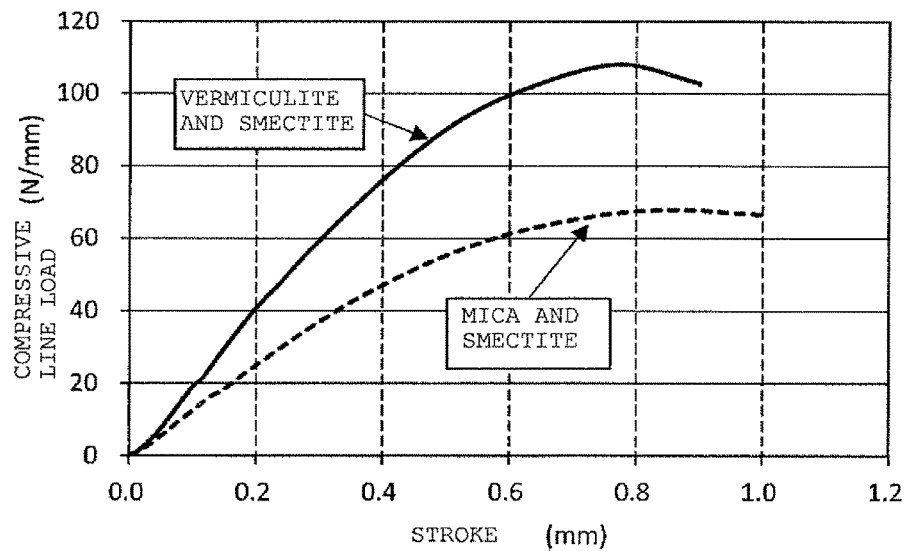

BASE MATERIAL FOR DISK ROLL, PRODUCTION METHOD THEREOF, DISK ROLL AND PRODUCTION METHOD THEREOF

TECHNICAL FIELD

The present invention relates to a base material for a disk roll, a production method thereof, a disk roll and production method thereof. The present invention particularly relates to a disk roll suitable for producing a sheet of glass and a base material thereof, and also a method of producing those.

BACKGROUND ART

A sheet of glass is produced in such a manner that a glass melt is continuously supplied to a device, flowed down from the device in belt and cooled and cured during flowing down. Disk rolls work as a pair of drawing rolls and are used to forcibly send downward a belt-like glass melt with it sandwiched therebetween.

A tabular glass may be produced according to a float method, a roll-out method, or a Colburn method, other than the down-drawing method. The sheet of glass produced according to any method needs a slow cooling step to remove thermal stress due to heat. To transport the sheet of glass in the slow cooling step, a disk roll that works as a skid is used.

The disk roll is generally formed in such a manner that a base material (mill board, planar compact) for a disk roll is punched in a ring, a plurality thereof are fitted to a shaft part that becomes a rotation axis by insertion to form a roll-like stacked material, followed by pressing and fixing an entirety via flanges provided to both ends. An outer peripheral surface of the base material for a disk roll punched in a ring works as a transportation surface of the glass melt. In general, a ring-like base material for a disk roll may be called also as a "disk material".

Since the disk roll transports a belt-like melt of glass for a long time, a disk roll part is demanded to have heat resistance, compressive strength and wear resistance. Furthermore, since a sheet of glass to be produced tends to be a larger size, and accompanying this, a load applied on the disk roll tends to be larger. Therefore, the disk roll is demanded to have higher compressive strength. In order to respond to the demands like this, as the disk roll, a disk roll in which heat resistant inorganic fiber, mica, or clay is contained is known (Patent Literatures 1 to 3). Furthermore, a disk roll that uses a filler other than mica is also known (Patent Literature 4).

CITATION LIST

Patent Literature

Patent Literature 1: JP 2010-510956 W
Patent Literature 2: JP 2009-132619 A
Patent Literature 3: JP 2004-299980 A
Patent Literature 4: JP 2013-018681 A

Non-Patent Literature

Non-patent Literature 1: Seiichiro Uehara, "Basic Lecture on Clay 1, Structure and Chemical Composition of Clay" Nendo Kagaku, Vol. 40 (2)(2000), pp. 100-111

SUMMARY OF INVENTION

Technical Problem

As was described above, the higher compressive strength and wear resistance are demanded on a base material for a disk roll. Although disk rolls such as shown in Patent Literatures 1 to 4 have been known, further higher compressive strength and wear resistance have been demanded.

The present invention was performed in view of the above problems and intends to provide a base material for a disk roll and a disk roll which have excellent compressive strength and wear resistance. Furthermore, the present invention intends to provide a production method capable of producing such a base material for a disk roll and a disk roll.

Solution to Problem

In order to achieve the above object, the present invention provides a base material for a disk roll containing layered silicate, in which the layered silicate contains two or more kinds of minerals having an interlayer distance exceeding 10 angstroms.

Thus, when the base material for a disk roll contains a mineral having an interlayer distance exceeding 10 angstroms as the layered silicate, proper flexibility and elasticity may be provided to the base material for a disk roll to be able to enhance the compressive strength of the base material for a disk roll. Furthermore, when the base material for a disk roll contains two or more kinds of minerals like this, since when different kinds of minerals come into contact, catching is generated between minerals, and generation of worn chips (so-called powder dropping) during wearing may be suppressed, high wear resistance may be imparted to the base material for a disk roll.

The mineral having the interlayer distance exceeding 10 angstroms is preferably one having the interlayer distance equal to or smaller than 100 angstroms.

Thus, by setting an upper limit of the interlayer distance of the layered silicate contained in the base material for a disk roll, the compressive strength and wear resistance may be more efficiently obtained.

It is preferable that the mineral having the interlayer distance exceeding 10 angstroms is selected from minerals contained in a smectite group, a vermiculite group, and a chlorite group.

By adopting the mineral of the kind like this, the condition that the interlayer distance is 10 angstroms or larger may be readily satisfied, and the compressive strength and the wear resistance may be effectively obtained.

A mass ratio of the mineral having the interlayer distance exceeding 10 angstroms to a mass of the base material for a disk roll is preferably 5 to 60 mass %.

By making the mineral having the mass ratio like this and the interlayer distance exceeding 10 angstroms contain, sufficient compressive strength and wear resistance may be imparted to the base material for a disk roll.

It is preferable that any one of the above base materials for a disk roll includes an inorganic fiber and clay, in which a content ratio relative to a mass of the base material for a disk roll is 20 to 55 mass % for the inorganic fiber, and 5 to 50 mass % for the clay.

Thus, the base material for a disk roll of the present invention may contain the inorganic fiber and clay. Furthermore, in order to improve the heat resistance and thermal shock resistance, the contents thereof are preferably set as shown above.

The base material for a disk roll of the present invention may be formed in a ring shape.

Thus, the base material for a disk roll of the present invention may be formed in a ring shape, and the base material for disk rolls formed in a ring shape is useful as a constituent member of a cylindrical disk part.

The present invention provides a disk roll that is provided with the cylindrical disk part and a shaft part to which the disk part is fitted by insertion, in which the disk part contains the base material for a disk roll formed in the ring shape, and the disk part contacts with molten glass and is used to transport the glass.

In a disk roll in which a disk part is formed by using the base material for a disk roll formed in the ring shape like this, since the disk roll is formed with the base material for a disk roll having high compressive strength and high wear resistance, a disk roll by which, when transporting the glass, the glass is suppressed from being damaged and the powder fall is less is provided.

The present invention provides a production method of glass, which is provided with a transporting step of transporting a molten glass with the disk roll.

Thus, by using the disk roll provided with the base material for a disk roll of the present invention, since the glass may be transported with occurrence of flaw suppressed and with the powder fall from the disk roll suppressed, glass having high quality may be produced.

The present invention provides a production method of a disk roll provided with fitting by insertion the ring-shaped base material for a disk roll to a shaft part to produce a disk roll having a cylindrical disk part containing the base material for a disk roll and a shaft part to which the disk part is fitted by insertion.

According to the production method like this, a disk roll provided with the base material for disk rolls excellent in the compressive strength and wear resistance may be produced.

The present invention provides a production method of a base material for a disk roll including: preparing a slurry containing layered silicate; and producing a base material for a disk roll by molding the slurry, in which as the slurry, a slurry containing two or more kinds of the layered silicates having the interlayer distance exceeding 10 angstroms is prepared, and this is molded to produce a base material for a disk roll.

According to the production method of the base material for a disk roll like this, a base material for a disk roll having the high compressive strength and high wear resistance may be produced.

Advantageous Effects of Invention

A base material for a disk roll of the present invention may enhance the compressive strength of a base material for a disk roll and may impart high wear resistance thereto. Furthermore, in a disk roll that uses the base material for a disk roll of the present invention, when used to transport glass, the glass is suppressed from being damaged and the powder fall may be reduced. Furthermore, according to a production method of a base material for a disk roll and a production method of a disk roll of the present invention, a base material for a disk roll and a disk roll, which have such excellent functionality may be produced.

BRIEF DESCRIPTION OF DRAWINGS

FIG. 1 is a schematic diagram showing one example of a disk roll of the present invention;

FIG. 2 is a schematic diagram showing one usage example (sheet glass producing device) of a disk roll of the present invention;

FIG. 3 is a schematic configurational diagram showing a device used for measurement of the wear resistance in Examples and Comparative Examples;

FIG. 4 is a schematic configurational diagram showing a device used for measurement of the compression deformations in Examples and Comparative Examples; and FIG. 5 is a graph showing results of the compression deformations measured in Example 1 and Comparative Example 1.

DESCRIPTION OF EMBODIMENTS

In what follows, the present invention will be described in detail with reference to the drawings.

The base material for a disk roll of the present invention includes a layered silicate, and, contains two or more kinds of minerals having an interlayer distance exceeding 10 angstroms as the layered silicate. In the following description, the mineral having the interlayer distance exceeding 10 angstroms is called also a "long interlayer distance mineral". The long interlayer distance mineral has preferably the interlayer distance equal to or shorter than 100 angstroms.

The interlayer distance of the layered silicate is a distance between positions corresponding to adjacent silicate layers. The interlayer distance of the layered silicate may be called a distance between centers of gravity of the adjacent silicate layers.

According to Non-patent Literature 1 (Seiichiro Uehara, "Basic Lecture on Clay 1, Structure and Chemical Composition of Clay" Nendo Kagaku, Vol. 40 (2)(2000), pp. 100-111), minerals contained in a smectite group, a vermiculite group, and a chlorite group have the interlayer distance exceeding 10 angstroms. Therefore, the long interlayer distance mineral in the present invention is preferably selected from the minerals contained in the smectite group, vermiculite group, and chlorite group. Specific examples of the smectite group (hereinafter, called also as "smectite") include montmorillonite, beidellite, saponite, hectorite, and sauconite. Specific examples of the vermiculite group (hereinafter, called also as "vermiculite") include 3-octahedron type vermiculite and 2-octahedron type vermiculite. Specific examples of the chlorite group include donbassite, sudoite, cookeite, clinochlore, chamosite, and nimite.

By adopting one selected from the minerals contained in the smectite group, vermiculate group and chlorite group, the condition that the interlayer distance is 10 angstroms or longer may be readily satisfied, and the compressive strength and wear resistance may be more effectively obtained.

In the layered silicate, the interlayer distance extends or contracts depending on the composition or the like. In this case, the interlayer distance of the layered silicate may be obtained by X-ray diffractometry that uses an X-ray diffractometer (Ultima III produced by RIGAKU Corporation). By using a diffraction angle θ of a diffraction intensity obtained by the measurement of the interlayer distance, the interlayer distance may be obtained according to the following formula.

$$2d \cdot \sin\theta = \lambda$$

d: interlayer distance
θ: diffraction angle
λ: X-ray wavelength for measurement

The interlayer distance measured like this may be used also as the interlayer distance of the layered silicate.

The long interlayer distance mineral may be contained also in the base material for a disk roll by selecting a plurality of kinds from, for example, the smectite group, and may be contained also in the base material for a disk roll by selecting a plurality of kinds from the vermiculite group or chlorite group. Furthermore, the long interlayer distance mineral contained in the base material for a disk roll may be selected by one kind from the smectite group, and, may be selected by one kind from the vermiculite group or chlorite group. Furthermore, the long interlayer distance mineral that is contained in the base material for a disk roll may be three kinds or more.

According to the non-patent literature 1, layered silicates such as a serpentine-kaolin group, a halloysite group, a talc-pylophyllite group, a mica group, and a brittle mica group have the interlayer distance of 10 angstroms or shorter. In the base material for a disk roll of the present invention, as was described above, two or more kinds of minerals having the interlayer distance exceeding 10 angstroms are required to be contained. However, as long as these are contained, other than these, a mineral having the interlayer distance of 10 angstroms or shorter (short interlayer distance mineral) may be contained. Furthermore, the base material for a disk roll may not contain the mineral having the interlayer distance of 10 angstroms or shorter.

As was described above, when the base material for a disk roll contains a mineral having the interlayer distance exceeding 10 angstroms (a long interlayer distance mineral) as the layered silicate, proper flexibility and elasticity may be provided to the base material for a disk roll (This effect may be generally called as an "accordion effect".). Thereby, the compressive strength of the base material for a disk roll may be enhanced. Furthermore, when the base material for a disk roll contains two or more kinds of the long interlayer distance minerals, the catching is generated between the minerals when different kinds of minerals come into contact (This effect may be generally called an "anchoring effect" or "anchor effect".). Thus, since the generation of a wearing debris when worn (so-called powder fall) may be suppressed, high wear resistance may be imparted to the base material for a disk roll. Thus, in the base material for a disk roll of the present invention, high compressive strength and high wear resistance may be combined, furthermore, the balance therebetween is made excellent.

Furthermore, as was described above, the long interlayer distance mineral having the interlayer distance equal to or shorter than 100 angstroms is preferably used. This is because the compressive strength and wear resistance may be more effectively obtained.

A mass ratio relative to a mass of the base material for a disk roll of the long interlayer distance mineral is preferably 5 to 60 mass %. When the mineral having the interlayer distance exceeding 10 angstroms is contained in the mass ratio like this, sufficient compressive strength and wear resistance may be imparted to the base material for a disk roll. This mass ratio is more preferably 7 to 50 mass %, and particularly preferably 10 to 40 mass %.

Furthermore, in the base material for a disk roll of the present invention, as was described above, two or more kinds of the long interlayer distance minerals are used as the layered silicate. As a mass ratio between the long interlayer distance minerals, a content of remaining one kind of layered silicate when an optional one kind is removed is preferably 10 mass % or larger. When, for example, two kinds are used as the long interlayer distance minerals, a mass ratio between the long interlayer distance minerals is preferably set to 10%:90% to 90%:10%. This is because it is considered that the anchoring effect is more effectively effected. Furthermore, this mass ratio is more preferably set to 1:4 to 4:1.

Furthermore, the base material for a disk roll of the present invention preferably contains an inorganic fiber and clay.

In the present invention, as the inorganic fiber, various kinds of inorganic fibers that have been used in the disk roll may be appropriately used. Example thereof include a ceramic fiber, a mullite fiber, an alumina fiber, a silica fiber, a silica/alumina fiber, a glass fiber, and a rock wool fiber. Among these, the alumina fiber, mullite fiber, silica/alumina fiber and silica fiber having excellent heat resistance are preferable. Furthermore, the inorganic fibers may be used in combinations of two or more kinds thereof as needs arise.

A content ratio of the inorganic fiber relative to a mass of the base material for a disk roll is preferably 20 to 55 mass %. This content ratio is more preferably 30 mass % or higher and 50 mass % or lower, further preferably 33 mass % or higher and 45 mass % or lower, and particularly preferably 35 mass % or higher and 43 mass % or lower. This is because when the inorganic fiber is contained in the range of 20 mass % or higher, the heat resistance and thermal shock resistance are preferably improved. Furthermore, when the inorganic fiber is contained in the range of 55 mass % or lower, the density of the base material for a disk roll may be maintained sufficiently high, and the working property may be improved.

In the inorganic fiber used in the present invention, as a ratio to an entirety of the inorganic fiber, usually, the alumina is contained in the range of 40 mass % or higher and 99 mass % or lower, preferably 40 mass % or higher and 80 mass % or lower, more preferably 70 mass % or higher and 80 mass % or lower, further more preferably 70 mass % or higher and 75 mass % or lower. Furthermore, in the inorganic fiber, usually, the silica may be contained in the range of 1 mass % or higher and 60 mass % or lower, preferably 20 mass % or higher and 60 mass % or lower, more preferably 20 mass % or higher and 30 mass % or lower, and further preferably 25 mass % or higher and 30 mass % or lower. As the alumina increases, the heat resistance increases.

In the present invention, as the clay, kibushi clay, bentonite, kaolin clay, gairome clay, and refractory clay may be used. The kibushi clay and bentonite are particularly preferably used. These clays may be used singularly or in a combination of two or more kinds thereof.

The clay is contained preferably in the range of 5 to 50 mass % relative to the mass of the base material for a disk roll. This content ratio is more preferably 10 mass % or higher and 48 mass % or lower, further preferably 15 mass % or higher and 45 mass % or lower, and particularly preferably 20 mass % or higher and 45 mass % or lower. When the content of the clay is 5 mass % or higher, the wear resistance may be further enhanced, and when the content of the clay is 50 mass % or lower, the productivity may be more improved.

In the base material for a disk roll of the present invention, it is preferable that, as needs arise, the kibushi clay is contained in the range of 2 mass % or higher and 30 mass % or lower relative to a mass of the base material for a disk roll. This content ratio is more preferably 5 mass % or higher and 25 mass % or lower and particularly preferably 10 mass % or higher and 20 mass % or lower. When the kibushi clay is contained in this range, the surface lubricity (smoothness) is improved.

The base material for a disk roll of the present invention, as needs arise, preferably contains the bentonite having the smectite (specifically montmorillonite) as a main component in the range of 2 mass % or higher and 30 mass % or lower. This content ratio is preferably 5 mass % or higher and 25 mass % or lower, and particularly preferably 10 mass % or higher and 25 mass % or lower. When the base material for a disk roll contains the bentonite, fixation and aggregation become sufficient, and the water filtering property is improved. By contrast, when the content of the bentonite is 30 mass % or lower, since the viscosity of the slurry does not become too high, the water filtering property is improved.

Although the layered silicate classified into the long interlayer distance mineral may be contained also in the clay component, the layered silicate is also counted in the mass ratio relative to the mass of the base material for a disk roll of the long interlayer distance mineral. In the case where two or more kinds in combination of the long interlayer distance minerals contained in the clay component and the long interlayer distance mineral used other than this are contained together, the effect of the present invention may be exhibited. In the long interlayer distance mineral contained in the clay component and the long interlayer distance mineral used other than this, the same kind may be used.

Furthermore, the base material for a disk roll of the present invention is not particularly limited by a shape. However, it may be formed in a tabular shape, for instance, other than a square shape, may be formed in a ring shape.

Thus, the base material for a disk roll of the present invention may be formed in a ring shape. By stacking the ring-shaped base materials for a disk roll to form a cylindrical disk part, a constituent component of the disk roll may be formed.

Next, with reference to FIG. 1, a structure of the disk roll of the present invention will be described. A disk roll 10 of the present invention includes a cylindrical disk part 13 and a shaft part 11 to which the disk part is fitted by insertion. Furthermore, the disk part 13 is formed by fitting a plurality of base materials for a disk roll 12 by insertion to a shaft part 11. A plurality of the ring-shaped base materials for a disk roll 12 fitted to the shaft part 11 by insertion is formed into a roll-like laminate, and via flanges 14 arranged at both ends thereof, an entirety is compressed and fixed by nuts 15 or the like with a slight compression applied to the base material for a disk roll 12. The disk roll 10 of the present invention contains one obtained by forming the base material for a disk roll of the present invention into a ring shape as the base material for a disk roll 12. Furthermore, the disk part 13 comes into contact with a molten glass and is used for transporting glass.

The disk roll 10 is assembled in a sheet glass production device 100 shown in, for example, FIG. 2 and may be used to mold and transport a sheet of glass. The sheet glass production device 100 is a production device that continuously exhausts a belt-like glass melt 110 from a linearly opened slit 102 of a melt furnace 101, flows down the exhausted belt-like glass melt 110, and cools and hardens during flowing down to produce a sheet of glass. Here, the disk rolls 10 work as a pair of drawing rolls to forcibly send out (transport) the belt-like glass melt 110 downward with the belt-like glass melt 110 sandwiched therebetween.

Since the disk roll of the present invention is a disk roll obtained by making a base material for a disk roll containing two or more kinds of the long interlayer distance minerals a disk part, the base material for a disk roll having high compressive strength and high wear resistance is used. Therefore, when using in transportation of glass, a disk roll in which the glass is suppressed from being damaged and the powder fall is suppressed low is formed.

Next, production methods of the base material for a disk roll and the disk roll will be described.

A production method of a base material for a disk roll of the present invention includes: a step (step a) of preparing a slurry containing a layered silicate; and a step (step b) of producing a base material for a disk roll by molding the slurry. Furthermore, according to the production method of a base material for a disk roll of the present invention, in the step a, as the slurry, a slurry containing two or more kinds of layered silicates (long layered silicate) having an interlayer distance exceeding 10 angstroms is prepared. The slurry is molded in the step b to produce a base material for a disk roll.

According to the production method of a base material for a disk roll like this, a base material for a disk roll having the high compressive strength and high wear resistance may be produced.

More specifically, an aqueous slurry containing predetermined amounts of two or more kinds of long interlayer distance minerals, an inorganic fiber, a clay (kibushi clay, bentonite), as needs arise, a filler, a coagulant, and an organic binder is prepared, the aqueous slurry is molded, dried to be able to obtain a base material. A method of molding and drying the aqueous slurry may be made, for example, a paper making method, or a dewatering molding method in which suctioning is performed from one surface while a slurry is fed on the other surface of a molding die such as a metal mesh. A thickness of the base material for a disk roll may be appropriately set and is generally 2 to 30 mm.

Next, with reference to FIG. 1, a production method of a disk roll will be described. The base material for a disk roll produced as shown above is punched in a ring shape to form a ring-like base material for a disk roll 12. Thereafter, a fitting by insertion step of fitting the ring-like base material for a disk roll 12 to a shaft part 11 by insertion is provided. In the fitting by insertion step, a disk roll provided with a cylindrical disk part 13 containing the ring-like base material for a disk roll 12 and the shaft part 11 to which the disk part 13 is fitted by insertion is produced. According to the production method like this, a disk roll provided with the base material for a disk roll having excellent compressive strength and wear resistance may be produced.

More specifically, the disk roll may be produced as shown below. A plurality of sheets of the base material for a ring-like disk roll 12 are fitted by insertion to a metallic (for example, iron, stainless steel) shaft part 11 to form a roll-like stacked material (disk part 13), with an entirety pressurized from both ends via flanges 14 arranged at both ends to apply a slight pressure to the base material for a ring-like disk roll, followed by fixing with a fixing tool such as nuts 15. As needs arise, firing is applied. Although the firing may be applied before filling by fitting to the shaft part by insertion or after filling, but the firing is preferable to be applied after filling. Then, by polishing an outer periphery surface of the disk part 13 (that is, an outer periphery surface of the base material for a ring-like disk roll 12), a disk roll 10 is obtained.

The hardness (Shore D Hardness) of the disk part in the disk roll is usually 30 to 70, preferably 35 to 65. The packing density of the disk part is usually 1.0 to 1.5 g/cm$^3$, and preferably 1.1 to 1.4 g/cm$^3$.

As a structure of a disk roll, there are one having a specification that an entire shaft part is covered with a base material for a ring-like disk roll, or one having a specification in which only a part that contacts with glass is covered with the base material for a ring-like disk roll, and any one may be used.

EXAMPLES

In what follows, the present invention will be specifically described with reference to Examples and Comparative Examples. However, the present invention is not limited to these.

Example 1

Like a composition (mass %) shown in Table 1, an aqueous slurry containing 32 mass % of vermiculite, 10 mass % of smectite (specifically, montmorillonite), 40 mass % of inorganic fiber (a mullite fiber made of 70 mass % or higher of alumina and 30 mass % or lower of silica), 10 mass % of kibushi clay, 6 mass % of pulp and 2 mass % of starch was prepared, followed by applying a suction and dehydration forming method to form a base material (mill board) for a disk roll having a dry dimension of 200 mm×200 mm×6 mm.

An obtained base material for a disk roll was subjected to evaluations of the following (1) to (4). Results are shown in Table 1.

(1) Surface Smoothness Test

Of each of the obtained base materials for a disk roll, an arithmetic average roughness Ra, a maximum height Ry, and a 10 points average roughness Rz were measured with a stylus type surface smoothness meter (JIS B 0651) according to a method defined by JIS B 0601-1994.

(2) Impact Resistance Test

The base material for a disk roll was punched into rings having an outer diameter of 60 mm and an inner diameter of 20 mm to prepare ring-like base materials for a disk roll. These were fitted by insertion to a stainless steel shaft part having a diameter of 20 mm, roll-building was carried out such that a length may be 100 mm and packing density may be 1.35 g/cm$^3$, thus, a disk roll for test was prepared. The disk roll for test was put in a furnace at 900° C., and, after holding for 3 hours, was taken out of the furnace. Immediately after taking out, a stainless steel (350 g) impact tool was dropped from a predetermined height (50 to 300 mm). An appearance was observed after dropping. A height when a crack was generated was taken as an impact strength.

(3) Wear Test

The base material for a disk roll was punched into rings having an outer diameter of 70 mm and an inner diameter of 20 mm to prepare ring-like base materials for a disk roll. These were fitted by insertion to a stainless steel shaft part having a diameter of 20 mm, roll-building was carried out such that a length may be 100 mm and packing density may be 1.35 g/cm$^3$, thus, a disk roll was prepared. Thus prepared disk roll is shown as a disk roll 310 for test of FIG. 3(*a*). After the disk roll 310 for test was heated at 900° C. for 3 hours, on a surface of the disk roll part of the disk roll 310, an aluminum shaft (abrasion material 322) having a diameter of 12 mm on which 10 grooves having a width of 1 mm were provided at an interval of 1 mm was contacted. On the abrasion material 322, a load was applied with a weight 324. With the abrasion material 322 contacted with the disk part of the disk roll 310, the disk roll 310 was rotated for 15 minutes, and a depth of a groove formed on a surface of the disk part of the disk roll 310 was measured. FIG. 3(*b*) is a schematic diagram obtained by expanding by laterally seeing a dotted line part of FIG. 3(*a*). On the abrasion material 322, actually, 10 grooves such as shown above are processed.

(4) Compressive Strength Test

From the base material for a disk roll obtained as was described above, a measurement sample 423 of a shape as shown in FIG. 4(*a*) was prepared. A sample was formed such that an outer diameter of a contact part shown in FIG. 4(*a*) is 65 mm and a length of the contact part shown in FIG. 4(*a*) is 30 mm. The measurement sample 423 is provided with a through-hole for fitting to the shaft part. The measurement sample 423 was fitted to the shaft part 411 by insertion as shown in FIG. 4(*b*), and fixed with nuts 415 via flanges 414. In this state, as shown in FIG. 4(*b*), the measurement sample 423 was sandwiched by an upper compression element 432 and a lower compression element 434, the upper compression element was compressed from an upper direction, and a linear weight when broken was calculated. Furthermore, a subsided deformation amount (stroke) when a predetermined weight is applied was measured.

Examples 2 to 4

As shown in Table 1, base materials for a disk roll and disk rolls were produced and evaluated in the same manner as Example 1 except that an amount of the layered silicate was changed. Results are shown in Table 1.

Comparative Example 1

As shown in Table 1, a base material for a disk roll and a disk roll were produced and evaluated in the same manner as Example 1 except that mica (interlayer distance is 10 angstroms or shorter) and smectite (specifically montmorillonite) were used as the layered silicate. Results are shown in Table 1.

Comparative Example 2

As shown in Table 1, a base material for a disk roll and a disk roll were produced and evaluated in the same manner as Example 1 except that only smectite (specifically montmorillonite) was used as the layered silicate. Results are shown in Table 1.

TABLE 1

| | | Example 1 | Example 2 | Example 3 | Example 4 | Comparative Example 1 | Comparative Example 2 |
|---|---|---|---|---|---|---|---|
| Composition (mass %) | Vermiculite | 32 | 40 | 20 | 10 | | |
| | Smectite | 10 | 2 | 10 | 20 | 22 | 42 |
| | Mica | | | 12 | 12 | 20 | |
| | Mullite Fiber | 40 | 40 | 40 | 40 | 40 | 40 |
| | Kibushi Clay | 10 | 10 | 10 | 10 | 10 | 10 |
| | Pulp | 6 | 6 | 6 | 6 | 6 | 6 |

TABLE 1-continued

| | | Example 1 | Example 2 | Example 3 | Example 4 | Comparative Example 1 | Comparative Example 2 |
|---|---|---|---|---|---|---|---|
| | Starch | 2 | 2 | 2 | 2 | 2 | 2 |
| Surface Smoothness of base material | Arithmetic average roughness Ra (μm) | 1.3 | 1.4 | 1.2 | 1.2 | 1.9 | 2.1 |
| | Maximum height Ry (μm) | 11.2 | 12.2 | 11.0 | 10.7 | 14.9 | 16.3 |
| | 10 point average roughness Rz (μm) | 7.6 | 8.2 | 7.4 | 7.1 | 11.0 | 12.5 |
| | Impact test (height mm) | 250 | 250 | 300 | 300 | 250 | 200 |
| | Wear amount (mm) | 0.26 | 0.28 | 0.32 | 0.30 | 0.54 | 0.58 |
| | Compressive strength (N/mm) | 108 | 105 | 94 | 103 | 68 | 72 |

As shown in Table 1, in Examples 1 to 4 in which two kinds of the layered silicates (vermiculite and smectite) having the interlayer distance exceeding 10 angstroms were used as the layered silicate, the abrasion amounts of the disk rolls were remarkably smaller in comparison with Comparative Examples 1, 2. Furthermore, it is found that in Examples 1 to 4, the compressive strengths were also higher than Comparative Examples 1, 2. Furthermore, regarding also the surface smoothness of the base material for a disk roll, Examples 1 to 4 had excellent results than Comparative Examples 1, 2. Regarding also the impact resistance, Examples 1 to 4 had results not inferior to Comparative Examples 1, 2. In particular, Examples 3 and 4 had excellent results of the impact resistance compared with Comparative Examples 1, 2. From these results, it was found that the base materials for a disk roll of the present invention and disk rolls have excellent wear resistance and compressive strength.

Furthermore, relation between compressive line load and stroke (compression deformation amount) obtained in the compressive strength test of Example 1 and Comparative Example 1 is shown in FIG. 5. Also from this result, it was found that Example 1 where vermiculate and smectite both having the interlayer distance exceeding 10 angstroms were used in combination has higher compressive strength than Comparative Example 1 where smectite, and mica having the interlayer distance of 10 angstroms or shorter were used in combination.

Incidentally, the present invention is not limited to the above embodiments. The embodiments are only illustrative, and ones that have substantially the same constitution as the technical ideas described in the range of claims of the present invention and that exhibit the similar action effect are all contained in the technical ranges of the present invention.

The invention claimed is:

1. A base material for a disk roll comprising:
   a layered silicate,
   wherein the layered silicate contains two or more kinds of minerals having an interlayer distance exceeding 10 angstroms,
   the two or more kinds of minerals having an interlayer distance exceeding 10 angstroms include at least a vermiculite and a smectite, and
   a content ratio relative to a mass of the base material for a disk roll is 10 to 40 mass % for the vermiculite, and is 2 to 20 mass % for the smectite.

2. The base material for a disk roll according to claim 1, wherein the two or more kinds of minerals having the interlayer distance exceeding 10 angstroms have the interlayer distance equal to or shorter than 100 angstroms.

3. The base material for a disk roll according to claim 1, wherein a mass ratio of the mineral having the interlayer distance exceeding 10 angstroms to a mass of the base material for a disk roll is 12 to 60 mass %.

4. The base material for a disk roll according to claim 2, wherein a mass ratio of the mineral having the interlayer distance exceeding 10 angstroms to a mass of the base material for a disk roll is 12 to 60 mass %.

5. The base material for a disk roll according to claim 1, wherein the base material for a disk roll includes an inorganic fiber and clay,
   wherein a content ratio relative to a mass of the base material for a disk roll is 20 to 55 mass % for the inorganic fiber, and is 5 to 50 mass % for the clay.

6. A disk roll comprising:
   a cylindrical disk part; and
   a shaft part to which the disk part is fitted by insertion,
   wherein the disk part contains the base material for a disk roll according to claim 1,
   wherein the disk part contacts with molten glass and is used to transport glass.

7. A method of producing glass, comprising: transporting a molten glass with the disk roll according to claim 6.

8. A production method of a disk roll provided with a cylindrical disk part containing a base material for a disk roll and a shaft part to which the disk part is fitted by insertion comprising:
   fitting the base material for a disk roll according to claim 1 to a shaft part by insertion.

9. A production method of a base material for a disk roll comprising:
   preparing a slurry containing a layered silicate; and
   producing a base material for a disk roll by molding the slurry,
   wherein as the slurry, a slurry containing two or more kinds of layered silicates having an interlayer distance exceeding 10 angstroms is prepared, and this is molded to produce a base material for a disk roll, and thereby producing the base material for a disk roll includes a vermiculite and a smectite as the mineral having an interlayer distance exceeding 10 angstroms, wherein a content ratio relative to a mass of the base material for a disk roll is 10 to 40 mass % for the vermiculite, and is 2 to 20 mass % for the smectite.

10. The base material for a disk roll according to claim 1, wherein the layered silicate contains three or more kinds of minerals having an interlayer distance exceeding 10 angstroms.

11. The base material for a disk roll according to claim 5, wherein a content ratio relative to a mass of the base material for a disk roll is 30 to 45 mass % for the inorganic fiber, and is 20 to 45 mass % for the clay.

* * * * *